(12) United States Patent
Väänänen et al.

(10) Patent No.: US 7,406,661 B2
(45) Date of Patent: Jul. 29, 2008

(54) GRAPHICAL USER INTERFACE AND METHOD AND ELECTRONIC DEVICE FOR NAVIGATING IN THE GRAPHICAL USER INTERFACE

(75) Inventors: Johannes Väänänen, Oulu (FI); Jukka-Pekka Metsävainio, Oulu (FI); Anna-Leena Hartojoki, Oulu (FI)

(73) Assignee: Myorigo L.L.C., Wilmington, New Castle, DE (US)

( * ) Notice: Subject to any disclaimer, the term of this patent is extended or adjusted under 35 U.S.C. 154(b) by 552 days.

(21) Appl. No.: 10/968,796

(22) Filed: Oct. 19, 2004

(65) Prior Publication Data

US 2005/0076303 A1 Apr. 7, 2005

Related U.S. Application Data

(63) Continuation of application No. PCT/FI03/00315, filed on Apr. 17, 2003.

(30) Foreign Application Priority Data

Apr. 23, 2002 (FI) .................................. 20020783

(51) Int. Cl.
*G06F 13/00* (2006.01)
*G06F 15/00* (2006.01)
(52) U.S. Cl. ....................... 715/700; 725/112
(58) Field of Classification Search ......... 715/763–764, 715/779–780, 853–854, 790, 700; 725/25, 725/112
See application file for complete search history.

(56) References Cited

U.S. PATENT DOCUMENTS

| | | | |
|---|---|---|---|
| 4,155,085 A | | 5/1979 | Warnock et al. |
| 6,133,911 A | * | 10/2000 | Kim ........................... 715/719 |
| 6,775,659 B2 | * | 8/2004 | Clifton-Bligh ................. 707/1 |
| 2002/0101458 A1 | | 8/2002 | SanGiovanni |
| 2004/0221243 A1 | * | 11/2004 | Twerdahl et al. ............ 715/834 |

FOREIGN PATENT DOCUMENTS

| | | |
|---|---|---|
| EP | 0 911 750 A2 | 4/1999 |
| EP | 1 046 882 A2 | 10/2000 |
| EP | 1 134 552 A2 | 9/2001 |
| WO | WO 99/32960 | 7/1999 |
| WO | WO 01/78055 A1 | 10/2001 |

* cited by examiner

*Primary Examiner*—Cao Nguyen
(74) *Attorney, Agent, or Firm*—Cohen Pontani Lieberman & Pavane LLP

(57) ABSTRACT

A method, graphical user interface and electronic device for forming guiding lines in a graphical user interface of an electronic device comprising at least a display and a navigating device, wherein a potion of the virtual desktop area of the graphical user interface is seen on the display at a time. In the method, digital material is placed on the virtual desktop area. The method further comprises the steps of determining a point of origin within the digital material and defining at least two points through which a guiding line is drawn, the guiding line indicating the distance and/or direction to the point of origin. The guiding line is then displayed along with the digital material on the display.

23 Claims, 4 Drawing Sheets

GRAPHICAL USER INTERFACE AND METHOD AND ELECTRONIC DEVICE FOR NAVIGATING IN THE GRAPHICAL USER INTERFACE

RELATED APPLICATION

This is a continuation of International Application No. PCT/FI03/00315, filed Apr. 17, 2003.

BACKGROUND OF THE INVENTION

1. Field of the Invention

The present invention relates to mobile telecommunication systems. In particular, the present invention relates to a novel and improved graphical user interface, method and electronic device for forming guiding lines in a graphical user interface of an electronic device 2. Description of the Related Art The size of the display of an electronic device sets certain limits for presenting, e.g. digital information on the display. A small display is not the best place to present a large amount of information. If all of the information is presented on the display at a time, details become illegible. A solution to this problem is that a so-called virtual desktop is used. There the actual view of the digital information is (much more) greater than the size of the display device. Therefore, means for scrolling the information is needed. This is achieved, e.g. with scroll bars located on the display.

Even if scroll bars are not used, there still are drawbacks with the present solutions. The biggest problem is that when the material to be presented on the display is considerably larger than the display area, the current location within the material is not well perceived. Let us say, a hand-held device, e.g. a Portable Digital Assistant (PDA), consists of a map application. The map comprises an area of which only $\frac{1}{10000}$ can be presented on the display of the hand-held device at a time. In other words, the map constitutes e.g. of a 100×100 two-dimensional matrix. The user of the hand-held device can move within the map, e.g. using scroll bars or some other method or means. When map element x:20 y:20 is presented on the display, it very hard to conclude how far it is e.g. to a desired element x:70 y:65. The situation becomes even more difficult when the user is allowed to use a zoom function.

There are many prior-art solutions to the above-mentioned problems. As said earlier, a user may be provided with scroll bars. Another solution is that when moved within a digital material, e.g. a map, the user is provided with coordinate readings. Yet another solution is to show the coordinate reading of the cursor on the display. Yet another solution is to show the map grids on the display.

There are, however, several problems with the prior-art solutions. The problem with the scroll bars is that they need a certain amount of display space, the space already being limited. The problem is the same when presenting the coordinates numerically. When map coordinates are used, the user is not aware of his/her relative position on the whole map. Instead of, the coordinates express only certain measure scale of the digital material. Coordinates do not promote quick navigation.

Small devices, e.g. the display size of which is less than 10 inches, often use notably bigger virtual desktop than the actual display area. So, it may very hard for the user quickly to perceive the exact location on the virtual desktop. Therefore, it is for example difficult to return to a certain active area of the operating system, where specific functions or activities are started by activating, e.g. objects or icons. Moreover, it is difficult to move from an application to another on the virtual desktop if the accurate location of the destination application is not clear. Because the display devices are already small, display space should be reserved for the actual applications as much as possible. Most prior-art navigation solutions take their own parts of the display areas.

SUMMARY OF THE INVENTION

The present describes a method, a graphical user interface and an electronic device for forming guiding lines in a graphical user interface of an electronic device comprising at least a display and navigating means, wherein a portion of virtual desktop area of the graphical user interface is seen on the display at a time. In the method, digital material is placed on the virtual desktop area. The method further comprises the steps of determining a point of origin within the digital material and defining at least two points through which a guiding line is drawn, the guiding line indicating the distance and/or direction to the point of origin. The guiding line is then displayed along with the digital material on the display.

The present invention is based on the fact that the graphical user interface is provided with guiding lines. In one embodiment of the present invention, one or more concentric circles are formed within the user interface area, the point of concentricity being the point of origin. In another embodiment, one or more radial guiding lines are formed within the user interface area, the starting point of the guiding lines being the point of origin. The distance and/or direction to the point of origin is determined based on the angle between two adjacent radial lines.

The present invention has several advantages over the prior-art solutions. The present invention helps navigation and orientation in a virtual desktop, when the virtual desktop area is larger than the visible area on a display.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Reference will now be made in detail to the embodiments of the present invention, examples of which are illustrated in the accompanying drawings.

Figure 2A:
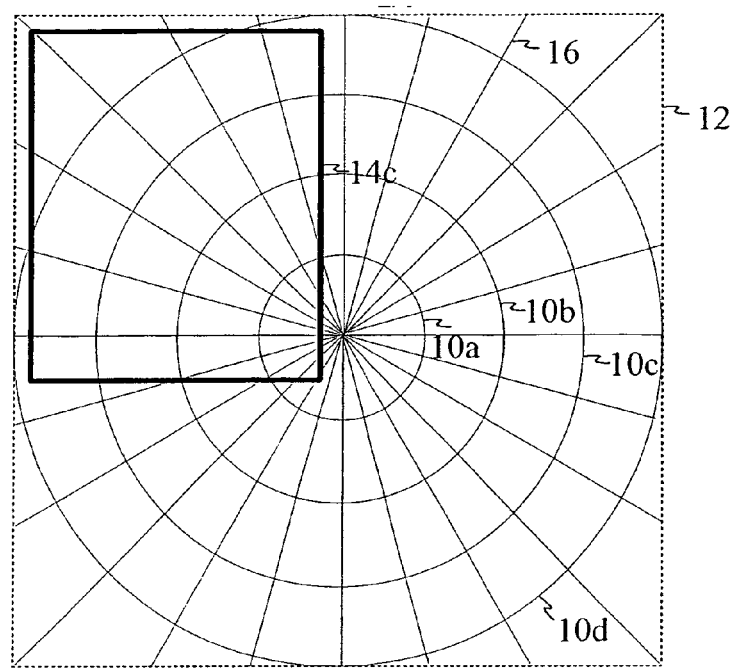
FIGS. 1a, 1b, 2a and 2b illustrate embodiments of the guiding lines, in accordance with the present invention.
Figure 1A:
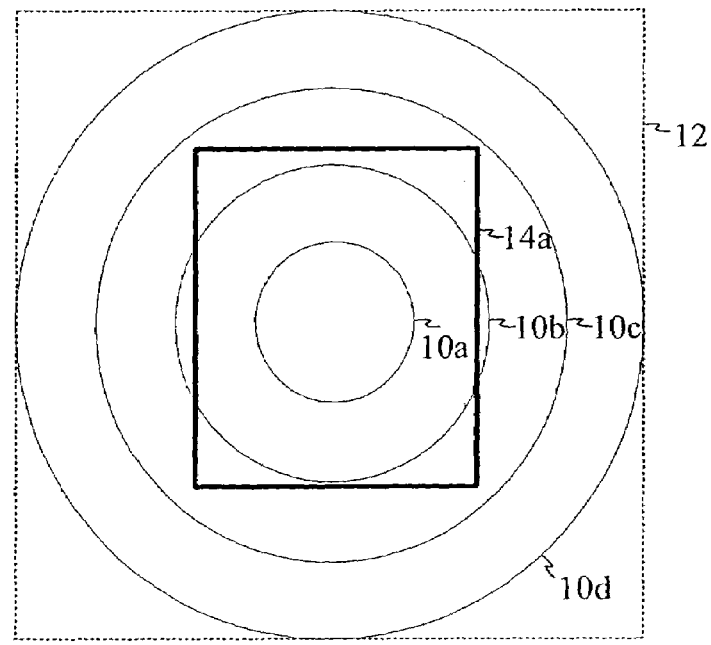
Figure 1B:
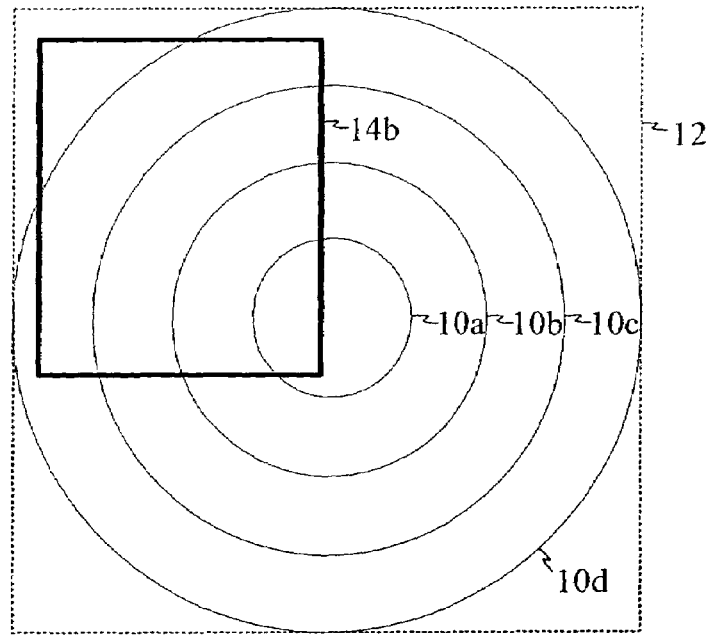

FIGS. 1a, 1b, 2a and 2b illustrate embodiments of the guiding lines. The area 12 represents the user interface area or virtual desktop being considerably larger than the visible display area. The areas 14a, 14b, 14c and 14d represent the visible areas of the display. In FIGS. 1a, 1b and 2a, there are concentric circles 10a ... 10d acting as guiding lines. It is very easy to observe based on the circles where the point of origin is. If the curvature degree of the visible part of a circle is strong, it means that the point of origin is not far away. Vice versa, if the curvature degree of the visible part of a circle is not so strong, it means that there is certain distance to the point of origin.

In one embodiment of FIG. 1a, the concentric guiding lines are replaced with elliptic lines.

Figure 2B:
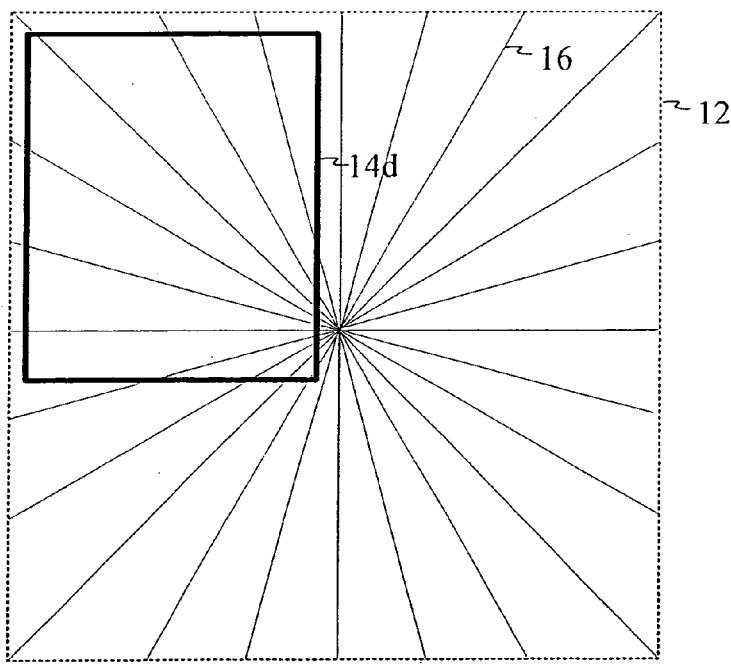

FIGS. 2a and 2b comprise radial guiding lines 16, the starting point being the point of origin. In FIG. 2a, both radial 16 and circular 10a ... 10d guiding lines are present. The distance to the point of origin can be determined based on the angle between two adjacent radial lines. It is easy to conclude based on the radial guiding lines where the point of origin is located.

Figure 3A:
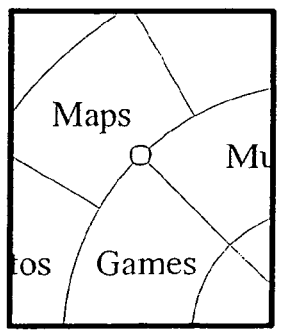
FIGS. 3a, 3b and 3c are views on a display using guiding lines, in accordance with the present invention.
Figure 3B:
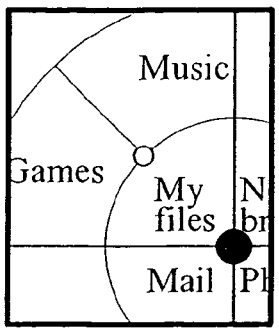
Figure 3C:
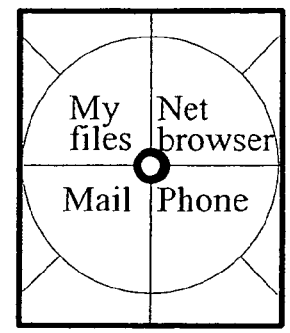

FIGS. 3a, 3b and 3c represent embodiments where the present invention can be used. FIGS. 3a, 3b and 3c are three different display views of a mobile terminal, e.g. a Personal Digital Assistant (PDA) or a mobile phone. The display views comprise circular and radial guiding lines. Based on these guiding lines, it is easy to navigate within the graphical user interface. In FIGS. 3a, 3b and 3c, the small circle located at the center of the display view is a static cursor. Moving the cursor means in fact moving the background (e.g. user interface, image, page, etc.) under the cursor. The view is moved until a desired area/point is under the static cursor. Then, the area/point can be selected by, e.g. the confirmation button of the device. To sum up, areas between guiding lines can be used as active regions, such as file folders, application startup buttons, etc.

Figure 4:
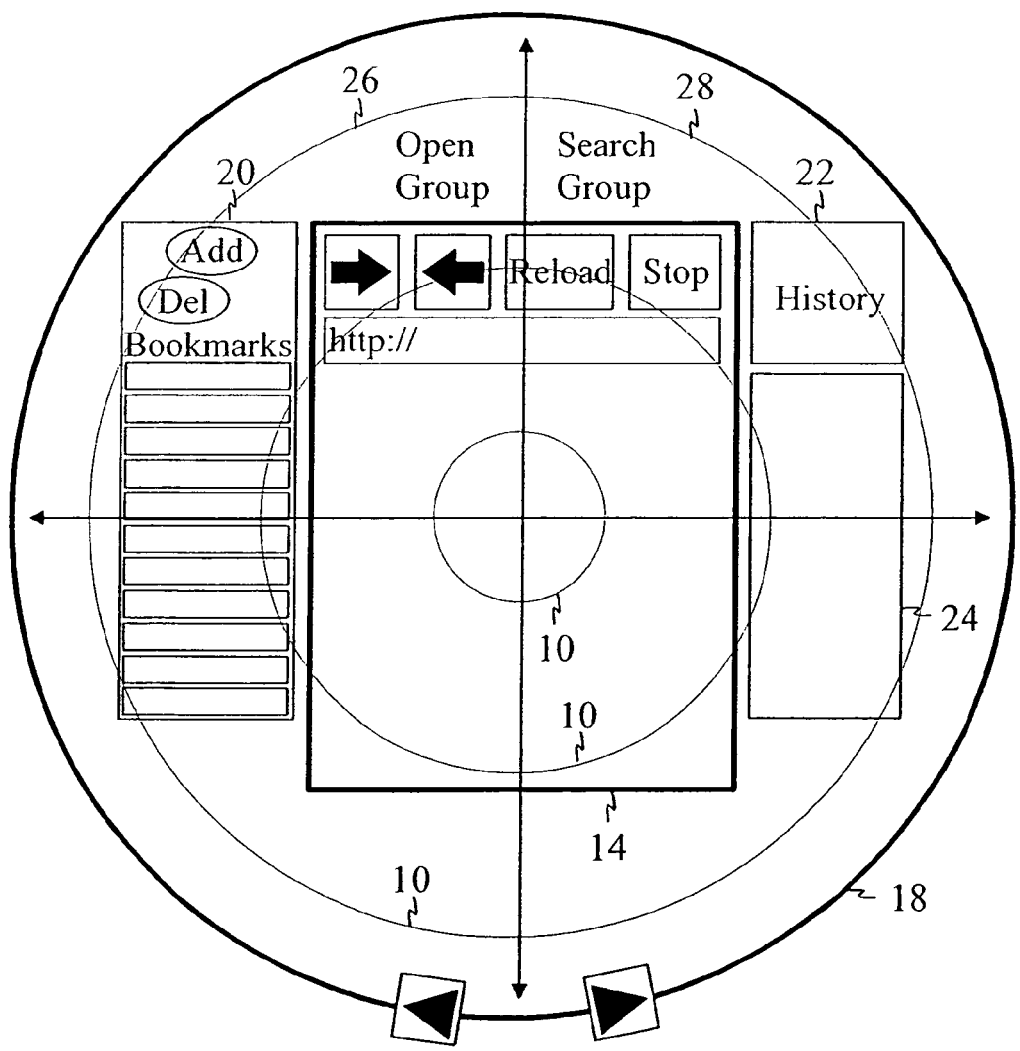
FIG. 4 is a graphical user interface utilising guiding lines, in accordance with the present invention.

FIG. 4 represents a graphical user interface utilising guiding lines. Planar user interface is build up in a circular form. The circular user interface 18 here consists of three inner rings 10 (guiding lines), which reduce in diameter towards the center point of the circle. The main functions of applications can be inserted at the center point of the circular user interface and secondary functions (20, 22, 24, 26, 28) can be located on the surrounding guiding lines (curves). For example, less important functions are located on the further circles, and more important functions are on the closer circles. Circular form and inner curves guide the user, and create a logical system of hierarchy for placing functions on the user interface. The area 14 represents the visible area of the display. In another embodiment the area 18 is displayed at a time on the display.

In one embodiment of FIG. 4, the guiding lines are be provided with assistance marks, if the lines are to be used to support measurement results based on the view. The distance between the assistance marks can be derived from the measure scale, or the assistance marks can be independent of the measure scale. In the latter case, the calculation of the distance between assistance marks do not require scale information from the application or digital material. Circular or elliptical guiding lines or the distance between assistance marks may scale along with the digital material when zoomed or they can be independent of the zoom factors according to the user settings. The point of origin can locate in the geometrical center point of the digital material or it can describe the substantial center point of the digital material. In this case the point of origin is set in the most essential area, e.g. in the are where the most essential hyperlinks are.

In one embodiment of FIG. 4, the guiding lines can be switched off if necessary. In a preferred embodiment, guiding lines are implemented with control procedures in association with the display adapter. Therefore, the central processing unit of the device does not have to process all the digital material between changes. If the material in its entirety fits on the display, the guiding lines may be neglected automatically. The contrast of the guiding lines may be adjusted so that the lines are visible everywhere in the material.

In one embodiment of FIG. 4, the guiding lines can be attached to the so-called virtual desktop of the operating system, where applications or other objects are opened. Each view may contain their own guiding lines. The digital material presented on the display may contain a definition for the center point of the material. Otherwise, the center point is in the geometrical center point of the material. When a material is presented in a perspective manned, i.e. the forefront being larger than the background, also the guiding lines can be presented in the same proportion than the displayed view. The calculations for placing the guiding lines can be executed by the user interface or the application in question, or the calculating feature can be incorporated within the display adapter. The calculation process itself is known to man skilled in the art, and therefore it is described on more detail.

If the application or other components edit the digital material, for instance create a perspective picture, it is advantageous to add guiding lines to the picture or to the material being formed before calculating the pixels representing the picture. In this way the dimensions will remain congruent. The application, central processing unit or display adapter then executes the actual calculating process.

In one embodiment of FIG. 4, when the operating system has been loaded to the initial state, the point of origin is displayed on the display of the device. The point of origin is preferably placed in the area of the most essential applications or icons. If the graphical user interface does not comprise a selection bar, then by pressing a button or by pointing the point of origin a menu is activated which is placed between the guiding lines. By choosing a menu item various kinds of functions can be activated. These areas (where the menus are located) can be active while being invisible because a user typically remembers where the most used functions are located. Therefore, it is not necessary to use visible desktop space for the menu.

When a user starts one or more applications they typically do not fit on the display screen area of an electronic device. Therefore the desktop is in the virtual state where only a portion of the virtual desktop area is seen at a time on the display. It may occur that when a user wants to start a new application, the present location in the virtual desktop does not comprise the point of origin or the necessary starting icons. However, the user can easily return to the point of origin in the virtual desktop because the virtual desktop comprises aforementioned guiding lines. When necessary actions are executed it is easy to return to the area where the user were before because the user memorised the curvature degree and position in the area of the application in question.

In some occasions the user may find the guiding lines disturbing. In those cases, the guiding lines can be switched off and be returned when needed again.

Figure 5:
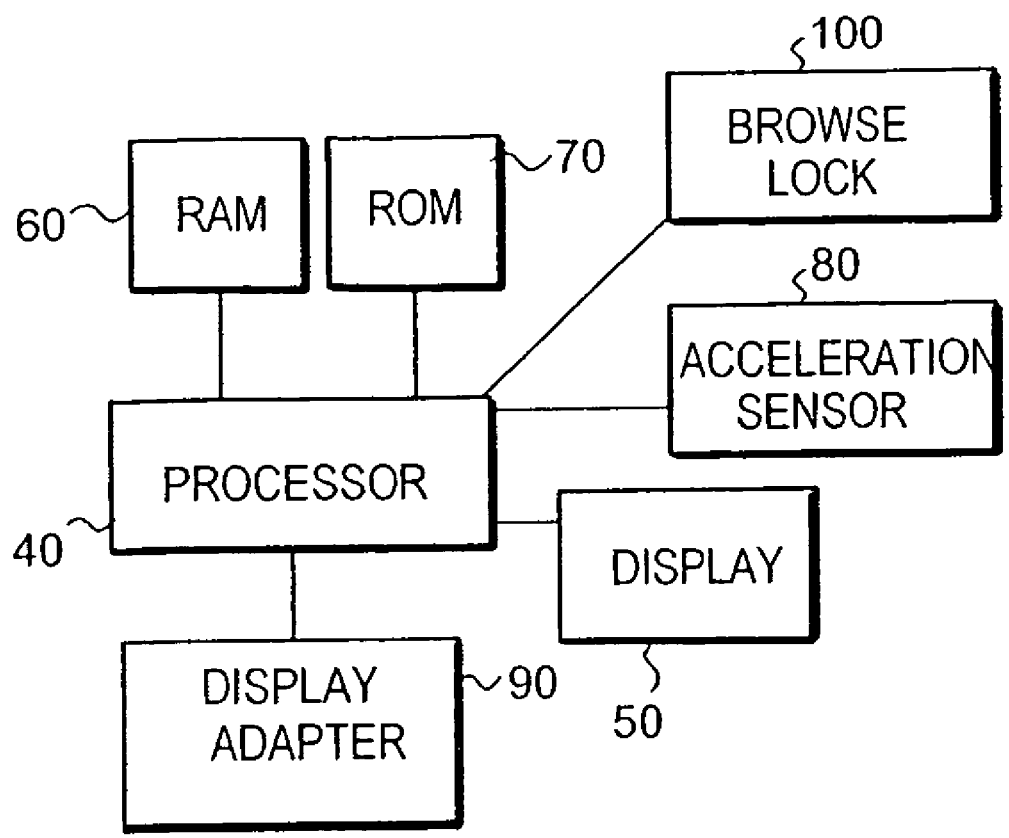
FIG. 5 is a block diagram illustrating the structure of an electronic device using guiding lines in the graphical user interface.

FIG. 5 represents one example of a preferred electronic device in accordance with the present invention. The electronic device is e.g. a mobile phone or a Personal Digital Assistant (PDA). The electronic device comprises a processor 40 and a display device 50 coupled to the processor 40. The data memory 60 and the program memory 70 are also coupled to the processor 40. The program memory 70 contains e.g. the operation system. The sizes of the memories, and the processing power of the processor 40 depend on the device and application used. The program memory 60 can additionally contain different kinds of software applications with which various tasks can be executed. Application software comprises e.g. word processing, graphical and spreadsheet software. The software applications and data used by them are loaded into the data memory 60 in order to be able to use the software.

The display adapter 90 controls the display device 50 with the processor 40. In order to not to use the data memory 60 for storing display-related information, the display adapter 90 comprises a data buffer in which the information to be displayed on the display device 50 is stored.

The electronic device comprises navigating means which in a one embodiment of the invention refer to acceleration sensor(s) 80. With the acceleration sensor(s) 80 it is possible to measure tilting movements of the electronic device. The processor 40 receives the measurement results and interprets them. The acceleration sensor(s) 80 can be e.g. piezo-electric or capacitive producing an analog voltage which is proportional to the acceleration factor.

With the acceleration sensor(s) 80 it is possible to measure one, two or three-dimensional accelerations. The measurement of tilting movements is based on the fact that the highest acceleration is parallel to the gravity of the earth. Therefore, the orientation of the electronic device can be defined in relation to the earth. It is also possible to use gyroscopes with its various forms to measure the orientation of the electronic device. The quantities measured are e.g. tilting angle and accelerations. Navigation in the graphical user interface is implemented by tilting the electronic device.

The relation information between the rotation degree of the electronic device and the memory address corresponding to the displayed view is stored e.g. on the data memory 60. The processor 40 defines the orientation of the electronic device in relation to the user or a reference position. The processor 40 may also define the distance between the user and the electronic device 40 or the user orientation in relation to the electronic device 40.

The most important point is not the way of how the aforementioned definitions are made but the fact that the orientation of the electronic device affects the information displayed on the display device 50. The memory space can be implemented logically, e.g. as a two-dimensional memory space. When browsing starts, the processor 40 starts the definition process of the new memory address from the current memory address so that displacement in the memory space corresponds to the direction and amount of change in orientation according to the relation information.

The electronic device comprises also a browse lock 100 with which it is signalled when browsing is executed. The orientation of the electronic device must remain in the same position in order to keep the view on the display device unchanged. In a preferred embodiment, the electronic device comprises a lock feature, e.g. a push-button, with which the browsing can be locked. The user can tilt the electronic device back to an appropriate viewing orientation in order to view the information on the display device 50 properly. The browsing may then continue when the button is released.

The electronic device comprises means for determining a point of origin within the digital material, means for defining at least two points through which a guiding line is drawn, the guiding line indicating the distance and/or direction to the point of origin and means for presenting the guiding line along with the digital material on the display. These means are preferably implemented using one or more of the following: the processor 40, display adapter 90, display 60 and memories 60 and 70.

The electronic device further comprises means for using the area between two concentric circles as an active region for starting applications, means for determining the distance and/or direction to the point of origin based on the angle between two adjacent radial lines, means for placing assistance marks on the guiding lines, means for zooming the user interface area, means for keeping the guiding lines and/or the assistance marks independent from the zoom factor, and means for accommodating the guiding lines and/or the assistance marks along with the zoom factor. These means are preferably implemented using one or more of the following: the processor 40, display adapter 90, display 60 and memories 60 and 70. It is obvious to a person skilled in the art that with the advancement of technology, the basic idea of the invention may be implemented in various ways. The invention and its embodiments are thus not limited to the examples described above, instead they may vary within the scope of the claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for forming guiding lines in a graphical user interface of an electronic device, the electronic device for performing the method comprising at least a processor, a memory, a display and navigating means for navigation within digital material from which only a portion is shown on the display at a time, the digital material to be presented on the display being considerably larger than an area of the display, the method comprising the steps of setting an origin at any desired point within the digital material, forming curved guiding lines rounding the origin, the curved guiding lines to cover all the digital material when placed over said material, displaying in addition to the portion of the digital material shown on the display the parts of the curved guiding lines overlapping said portion wherein a part of at least one curved line is visible on the display, the opening direction of said part pointing towards the origin, whereupon the parts of the curved lines currently visible on the display assist a user to navigate intuitively towards the origin.

2. The method according to claim 1, wherein the curved guiding lines are formed by concentric circles having the origin as the center, the circumferences of which cover all the digital material.

3. The method according to claim 2, wherein the area between two concentric circles is used as an active region for starting applications.

4. The method according to claim 2, wherein the distance between consecutive circles is constant.

5. The method according to claim 2, wherein the distance between consecutive circles depends on the position of the origin on the digital material.

6. The method according to claim 1, wherein the curved guiding lines are formed by ellipses having the origin as one of the foci.

7. The method according to claim 6, wherein the distance between consecutive circles depends on the position of the origin on the digital material.

8. The method according to claim 1, wherein assistance marks are introduced on the guiding lines.

9. The method according to claim 8, comprising the further steps of:
zooming in to or out of said user interface area; and
keeping the guiding lines and/or the assistance marks independent of the zoom factor.

10. The method according to claim 8, comprising the further steps of:
zooming in to or out of said user interface area; and
accommodating said guiding lines and/or said assistance marks along with the zoom factor.

11. A method for forming guiding lines in a graphical user interface of an electronic device, the electronic device for performing the method comprising at least a processor, a memory, a display and navigating means for navigation within digital material from which only a portion is shown on the display at a time, the digital material to be presented on the display being considerably larger than an area of the display, the method comprising the steps of
setting an origin at any desired point within the digital material,
forming radial guiding lines extending fan-like from the origin, the radial guiding lines to cover all the digital material when placed over said material,
displaying in addition to the portion of the digital material shown on the display the parts of the radial guiding lines overlapping said portion so that at least two guiding lines are visible on the display, wherein a user can navigate intuitively towards the direction where said guiding lines are coming closer to each other and, consequently, towards the origin.

12. The method according to claim 11 wherein the distance and/or direction to the origin is estimated on basis of the angle between two adjacent radial lines.

13. The method according to claim 11, wherein assistance marks are introduced on the guiding lines.

14. An electronic device having a processor, a memory, a display, a graphical user interface, and navigating means for navigating in digital material, wherein the digital material to be presented on the display is considerably larger than an area of the display and wherein only a portion of the digital material is seen on the display at a time, the electronic device comprising:
means for setting an origin at any desired point within the digital material,
means for forming curved guiding lines around the origin, the curved guiding lines to cover all the digital material when placed over said material, and
means for displaying in addition to the portion of the digital material shown on the display the parts of the curved guiding lines overlapping said portion, the opening direction of said parts pointing towards the origin, whereupon the parts of the curved lines currently visible on the display assist a user to navigate intuitively towards the origin.

15. The electronic device according to claim 14, wherein means for forming curved guiding lines generate concentric circles having the origin as the center, the circumferences of which cover all the digital material when placed over said material.

16. The electronic device according to claim 15, comprising means for using the area between two concentric circles as an active region for starting applications.

17. The electronic device as in claim 14, wherein means for forming curved guiding lines generate ellipses having the origin as one of the foci.

18. The electronic device according to claim 14, further comprising means for incorporating assistance marks on the guiding lines.

19. The electronic device according to claim 18, further comprising means for zooming into or out of the user interface area; and
means for keeping the guiding lines and/or the assistance marks independent of the zoom factor.

20. The electronic device according to claim 18, wherein the device further comprises:
means for zooming into or out of the user interface area; and
means for accommodating the guiding lines and/or the assistance marks along with the zoom factor.

21. An electronic device having a processor, a memory, a display, a graphical user interface, and navigating means for navigating within digital material, wherein the digital material to be presented on the display is considerably larger than an area of the display and only a portion of the digital material is seen on the display at a time,
the electronic device further comprising:
means for setting an origin at any desired point within the digital material,
means for forming straight guiding lines extending fan-like from the origin, the straight guiding lines to cover all the digital material when placed over said material, and
means for displaying in addition to the portion of the digital material shown on the display the parts of the straight guiding lines overlapping said portion, wherein a user can navigate intuitively towards the direction where said guiding lines are coming closer to each other, and, consequently, towards the origin.

22. The electronic device according to claim 21, further comprising means for evaluating the distance and/or direction to the origin on basis of the angle between two adjacent radial lines.

23. The electronic device according to claim 21, further comprising means for incorporating assistance marks on the guiding lines.

* * * * *